(12) United States Patent
Duerig et al.

(10) Patent No.: US 11,790,264 B2
(45) Date of Patent: Oct. 17, 2023

(54) SYSTEMS AND METHODS FOR PERFORMING KNOWLEDGE DISTILLATION

(71) Applicant: Google LLC, Mountain View, CA (US)

(72) Inventors: Thomas J. Duerig, Mountain View, CA (US); Hongsheng Wang, Sunnyvale, CA (US); Scott Alexander Rudkin, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 407 days.

(21) Appl. No.: 16/445,651

(22) Filed: Jun. 19, 2019

(65) Prior Publication Data

US 2020/0401929 A1 Dec. 24, 2020

(51) Int. Cl.
*G06N 20/00* (2019.01)
*G06N 5/02* (2023.01)

(52) U.S. Cl.
CPC ............... *G06N 20/00* (2019.01); *G06N 5/02* (2013.01)

(58) Field of Classification Search
CPC .................................. G06N 20/00; G06N 5/02
See application file for complete search history.

(56) References Cited

U.S. PATENT DOCUMENTS

2016/0078339 A1* 3/2016 Li .......................... G06N 3/045
706/20

OTHER PUBLICATIONS

Fukuda, T., et al, Efficient Knowledge Distillation from an Ensemble of Teachers, 2017, [retrieved Jan. 25, 2022], Retrieved from Internet:<https://www.isca-speech.org/archive_v0/Interspeech_2017/pdfs/0614.PDF> (Year: 2017).*

Guyon, I. et al, Feature Extraction: foundations and applications, 2008, [retrieved on Jul. 16, 2021], Retrieved from Internet:<https://books.google.com/books?hl=en&lr=&id=FOTzBwAAQBAJ&oi=fnd&pg=PA1&dq=feature+extraction&ots=5Ui9P58uq2&sig=UoAqGwvLOCaVG9IpYFBkkUJLE3Q#v=onepage&q&f=false> (Year: 2008).*

(Continued)

*Primary Examiner* — Miranda M Huang
*Assistant Examiner* — Bart I Rylander
(74) *Attorney, Agent, or Firm* — Dority & Manning, P.A.

(57) ABSTRACT

The present disclosure is directed to methods and systems for knowledge distillation. Implementations of the disclosure can include executing the following actions using one or more computing devices: obtaining an initial training dataset including multiple training examples; determining sets of outputs by performing inference on the training examples with a group of pre-trained machine-learned models that have been trained to perform a respective task based on a respective pre-trained model training dataset; evaluating a performance of each pretrained machine-learned model based at least in part on the set of outputs generated by the pre-trained machine-learned model; determining for the set of outputs generated by each pre-trained machine-learned model, whether to include one or more outputs of the set of outputs in a distillation training dataset based at least in part on the respective performance of such pre-trained machine-learned model; and training a distilled machine-learned model using the distillation training dataset.

20 Claims, 7 Drawing Sheets

(56) References Cited

OTHER PUBLICATIONS

You, S. et al, Learning from Multiple Teacher Networks, 2017, [retrieved on Jul. 16, 2021], Retrieved from Internet:<https://dl.acm.org/doi/pdf/10.1145/3097983.3098135> (Year: 2017).*

Hinton, G. et al, Distilling the Knowledge in a Neural Network, 2015, [retrieved on Jul. 16, 2021], Retrieved from Internet:< https://arxiv.org/pdf/1503.02531.pdf.> (Year: 2015).*

Avnimelech, R. et al, Boosted Mixture of Experts: An Ensemble Learning Scheme, 1999, [retrieved on Jul. 16, 2021], Retrieved from Internet:<http://www.cs.tau.ac.il/~nin/papers/bme_nc.pdf> (Year: 1999).*

Caruana, R. et al, Ensemble Selection from Libraries of Models, 2004, [retrieved on Jul. 16, 2021], Retrieved from Internet:<https://dl.acm.org/doi/pdf/10.1145/1015330.1015432> (Year: 2004).*

Guyon, I. et al, Feature Extraction: foundations and applications, 2008, [retrieved on Jul. 16, 2021], Retrieved from Internet:<https://books.google.com/books?hl=en&lr=&id=FOTzBwAAQBAJ&oi=fnd&pg=PA1&dq=feature+extraction&ots=5Ui9P58uq2&sig=UoAqGwvLOCaVG9lpYFBkkUJLE3Q#v=onepage&q&f=false> (Year: 2008).*

Jacobs, R., et al, Adaptive Mixtures of Local Experts, 1991, [retrieved Jun. 13, 2022], Retrieved from Internet: <https://ieeexplore.ieee.org/abstract/document/6797059> (Year: 1991).*

Jacobs, R. et al, Task Decomposition Through Competition in a Modular Connectionist Architecture: The What and Where Vision Tasks, [retrieved Jun. 21, 2022], Retrieved from Internet:<https://www.sciencedirect.com/science/article/abs/pii/036402139180006Q> (Year: 1991).*

Ba, L., et al, Do Deep Nets Really Need to be Deep?, [retrieved Nov. 21, 2022], Retrieved from Internet:<https://proceedings.neurips.cc/paper/2014/hash/ea8fcd92d59581717e06eb187f10666d-Abstract.html> (Year: 2014).*

* cited by examiner

SYSTEMS AND METHODS FOR PERFORMING KNOWLEDGE DISTILLATION

FIELD

The present disclosure relates generally to knowledge distillation. More particularly, the present disclosure relates to knowledge distillation methods and systems that can leverage a corpus of pre-trained models and/or the predictions from these models to learn a distilled model from unlabeled and/or weakly labeled datasets.

BACKGROUND

Advancements in machine-learning (ML) techniques and applications have led to an increase in the number of available machine learning models, as well as the ease of building new models using different datasets. While certain ML training datasets are widely available to the public, there is less aggregated information for pre-trained models built using these datasets. ML models can have various architectures that can be adapted to optimize performing a certain task or tasks. While this adaptability can be helpful for applying ML techniques across varied technical fields, it can also lead to knowledge segmentation since the datasets, data cleaning, and model architecture used by various developers can vary greatly.

Knowledge distillation has been proposed as a mechanism to transfer knowledge from an individual model or group of models (also known as "teacher(s)") to a single model (also known as a "student") by utilizing the predictions (e.g., outputs) of the individual model or group of models. Efforts in knowledge distillation have mainly focused on averaging the predictions of the teacher(s) while using the same datasets to train the student that were used to train the teacher(s). While this approach has shown some benefits, it also has drawbacks due to the need for continued and possibly immutable storage of the training datasets. Needed in the art are improved distillation techniques that can be applied with little or no knowledge of the teacher(s) architecture or training data.

SUMMARY

Aspects and advantages of embodiments of the present disclosure will be set forth in part in the following description, or can be learned from the description, or can be learned through practice of the embodiments.

One example aspect of the present disclosure is directed to methods for performing knowledge distillation. Each of these methods may include executing the following actions using one or more computing devices: obtaining an initial training dataset, the initial training dataset including multiple training examples; obtaining a plurality of sets of outputs respectively produced for the multiple training examples by a plurality of pre-trained machine-learned models, each of the pre-trained machine-learned models having been previously trained to perform a respective task based on a respective pre-trained model training dataset; evaluating a respective performance of each pretrained machine-learned model based at least in part on the set of outputs generated by the pre-trained machine-learned model; determining for the set of outputs generated by each pre-trained machine-learned model, whether to include one or more outputs of the set of outputs in a distillation training dataset based at least in part on the respective performance of such pre-trained machine-learned model; and training a distilled machine-learned model using at least a portion of the distillation training dataset.

Another example aspect of the present disclosure is directed to computing systems for performing knowledge distillation. In general, these computing systems can include one or more processors and one or more non-transitory computer-readable media that collectively store instructions that, when executed by the one or more processors cause the computing system to perform operations. These operations can include methods for performing knowledge distillation as disclosed herein or variations of these methods as would be understood by a person of ordinary skill in the art from this disclosure.

Other aspects of the present disclosure are directed to various systems, apparatuses, non-transitory computer-readable media, user interfaces, and electronic devices which implement techniques disclosed herein or that can be derived through practice of the disclosure.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

The present disclosure provides computing systems and methods directed to distillation of information from multiple machine-learned models based on evaluation of the performance of such models. In particular, aspects of the present disclosure are directed to systems and methods that intelligently select certain model outputs produced by machine-learned models for inclusion in a distillation training dataset that can be used to train a distilled machine-learned model. According to an aspect of the present disclosure, the model outputs can be selected for inclusion in the distillation training dataset based on an evaluation of the performance of the corresponding machine-learned model's ability to correctly infer outputs of that type or label. For example, outputs can be selected on a per label basis (e.g., based on the performance of the model relative to such label) and/or through application of one or more machine-learned trust models (e.g., that have been trained to predict the correctness of the corresponding model's outputs). In such fashion, a distillation training dataset can be generated (e.g., from weakly labeled or unlabeled data) which includes only model outputs that are high quality or otherwise associated with respective machine-learned models that have demonstrated expertise or competence in performing the specific task that led to such model output. Thus, the present disclosure provides an intelligent model evaluation and output selection process that leverages a corpus of existing machine-learned models and/or access to their predictions to generate a high-quality distillation training dataset (e.g., from majority weakly labeled and/or unlabeled data) which can be used to train a highly accurate distillation machine-learned model.

In particular, a computing system can have access to a corpus of existing machine-learned models which have been previously trained on different respective sets of training data. The pre-trained machine-learned models may have been trained to perform different respective tasks. The tasks may be related or unrelated. The pre-trained machine-learned models may be models that have been generated by the same or other entities (e.g., individuals, teams, corporations, corporate divisions, etc.) than the entity that is operating the computing system. The pre-trained models can be internally accessible (e.g., via a corporation or other entity's internal computing networks) or can be publicly accessible (e.g., via the Internet and/or a repository).

In some instances, however, the computing system may not have access to or knowledge of the respective training data used to train each pre-trained model, or even, in some cases, knowledge of the model's architecture. However, the computing system can generally be able to provide input data to each model and to receive an output (e.g., an inference or prediction) from each model based on the input data. As examples, the computing system can run the models or can interact with a host of the models (e.g., via an API) to receive the outputs. Thus, the computing system can perform inference with each pre-trained model to obtain outputs from the pre-trained model.

In yet other implementations, the computing system may not have access to pre-trained models or knowledge of the models' architectures, but instead may simply have access to sets of outputs known to have been previously generated for certain training examples by the pre-trained models. For example, a database may store sets of pre-trained model outputs for certain known inputs (e.g., training examples) which can be accessed by the computing system.

Generally, the group of pre-trained machine-learned models can each be configured to perform any task (e.g., classification, regression, detection, and encoding). For example, in certain implementations each pre-trained machine-learned model can be configured as a classifier, such as a binary image classifier, trained to infer a classification label for each training example as an output. In some implementations, the group of pre-trained machine-learned models can include a multi-label image classifier trained to infer one or more classification labels for each training example as an output.

As an example for illustration, knowledge from a group of machine-learned models can be distilled to take advantage of task specific and/or domain specific knowledge without requiring the complete datasets used to train each machine-learned model or, in some cases, even access to the model itself. For this example, each machine-learned model can be trained as a binary classifier to identify if an image depicts a certain breed of dog or not. By applying each machine-learned model to a dataset including images of different dog breeds, dog products, or other images, an initial prediction can be generated for an inferred breed for each training example in the dataset. Alternatively, previously generated predictions for the dataset can be accessed. By evaluating each model's predictions using the techniques disclosed herein, one or more expert machine-learned models can be identified that infer high-quality predictions. Using some or all of these high-quality predictions, a distillation model can be trained to perform a different, but potentially related task such as performing multi-class classification relative to all breeds of dogs.

Thus, an aspect of certain methods and systems described can include the ability to combine models from different domains without domain-specific expertise. For example, knowledge can be distilled from a group of machine-learned models where each has been trained to perform a task (e.g., image classification, natural language recognition, voice-to-text, etc.). By applying each machine-learned model to a training dataset that includes multiple training examples, an initial prediction can be generated for each machine-learned model on each training example. From these initial predictions, one or more expert models can be identified as a subset of the group of machine-learned models. After identifying the expert model(s) for a task, an output of the expert model (e.g., a label, an embedding, a probability, etc.) that are relevant to that task can be used to train a distillation model.

More particularly, to generate the distillation dataset, an initial dataset containing a number of training examples may first be obtained or generated. Generally, for methods described herein, the training examples included in the initial dataset do not need to be the same as the examples that were used to train each individual machine-learned model. Instead, by taking advantage of the knowledge contained in each machine-learned model, methods and systems disclosed herein may utilize initial datasets that include training examples for performing a task that is related or unrelated to the particular task(s) that each pre-trained model was trained to perform. As an example application, by including related training examples, the distillation dataset can be used to train a distillation model that can perform the respective task of each individual machine-learned model to condense the knowledge of separate machine-learned models into a single model. As another example application, by including unrelated training examples, the distillation dataset may be used to perform model discovery such that the distillation dataset can be used to train a distillation model that can perform a discovered task that was not performed by one of the machine-learned models or that was performed by the pre-trained model with lower accuracy compared to the distillation model.

In general, methods for performing knowledge distillation in accordance with this disclosure can be used with datasets that include labeled data (e.g., data including some ground truth or label), weakly labeled, unlabeled, or a combination of thereof. As an example, in certain implementations the initial dataset can include between about 20% to about 80% of unlabeled or weakly labeled training examples, such as between about 30% to about 75%, about 40% to about 70%, or about 50% to about 60%.

In some implementations, the training examples in the initial dataset can include mostly weakly labeled or unlabeled training examples. By leveraging the knowledge contained in each machine-learned model, the outputs selected for inclusion in the distillation training dataset may be considered trusted without the need for a validation dataset (e.g., on a per-label or per-task basis). However, in certain implementations the initial training dataset can include or be associated with a validation dataset that includes labeled data (e.g., training examples that have a ground truth answer or label). For implementations that include a validation dataset, the validation dataset may be used to assist in the determination of an expert machine-learned model for performing a certain task. The designation of an expert machine-learned model can be used to assign high quality labels to the weakly labeled or unlabeled data that may improve the performance of the distillation model by increasing the size and/or quality of the distillation training dataset.

Broadly, one goal of methods and systems described herein is to evaluate a body of training data using the knowledge of a group of pre-trained models. Aspects of the present disclosure include evaluating the outputs from the group of pre-trained models to determine which pre-trained models perform better at certain task(s). For example, a validation dataset can be used in some implementations to determine which model provides outputs that demonstrate higher quality, accuracy, and/or precision for a given task or label. Using this information, high-quality labels can be inferred for the unlabeled training examples without the need for manual labeling or additional data mining to expand the distillation training dataset. After generation of a distillation dataset containing high-quality labels, the distillation dataset can be used to train a distillation model.

Evaluating the performance of each pre-trained model can be accomplished in several ways such as analyzing each model on a per-label basis (e.g., find best performer for each label), training an additional model which can be referred to as a trust model, or a combination of both. Aspects of the current disclosure can include evaluating each pre-trained model's performance using a validation dataset that includes labeled examples (e.g., examples including or associated with a ground truth). Alternatively, the evaluation of each pre-trained model's performance can be based on the outputs generated by each pre-trained model using a dataset that includes only unlabeled or weakly labeled training examples.

In some implementations, analyzing each model on a per-label basis can include comparing the outputs from each pre-trained model to determine the best performer or a group of relatively higher performing pre-trained models for a given label. For example, an initial dataset including a validation dataset can be provided to two pre-trained models. Each pre-trained model can generate a set of outputs for both the unlabeled data (ul-output) and the validation data (l-output). The respective outputs generated for the validation data (l-output) can then be compared, for each of the two models, to the ground truth labels of the validation data to determine the best performer or expert model. For instance, each pre-trained model can be configured as a binary classifier trained to determine if an image included a certain dog breed or not. If one pre-trained model were to infer a breed for an image that depicted such breed of dog, while the other did not, this model can be considered the expert for that label. This performance comparison can be extended to outputs generated by each pre-trained model until some threshold is met (e.g., comparison to all models, to a majority of the models, or until enough training examples are associated with high-quality outputs for a label).

As another example, each pre-trained model can generate a set of outputs for both the unlabeled data and the validation data. A population or consensus label can then be determined using the output of each pre-trained model for a training example. The population or consensus label can be an average, distribution, or other statistic determined using the collective outputs. For instance, using the same dog breed example, the average output for a training example including an image of a collie should ideally be low (i.e., most of the pre-trained models were not trained to identify that specific breed). Selecting the expert pre-trained model can include comparing each model output for a training example to the consensus and selecting one or more models that differ from the consensus by a threshold (e.g., standard deviation, percentile, etc.). as the expert model(s) for a given label. In the case that more than one expert model is determined for assigning a label, high quality labels may be inferred as the consensus of all expert models. Alternatively, high quality labels may include any output by each expert model related to the label assigned or associated with that model.

Thus, analysis on a per-label basis can be focused on assessing the ability of each pre-trained model for performing a task (e.g., assigning a label) to determine an expert model for the task. The expert model for a task will be considered as producing high-quality inference, but only for the identified task. However, this does not omit the possibility that one pre-trained model may be configured to perform multiple tasks and so the same methodology may be used to assign one pre-trained model as the expert for one or more tasks. Similarly, this analysis may reveal that none of the pre-trained models are experts for a given task or that multiple pre-trained models are experts for a general task, but that other attributes of the input training examples can be used to assign multiple experts having complementary specializations. As an example, again using the dog breed scenario, one or more expert models can be assigned for detecting the same breed but differentiated based on the background in an image such as if the breed is on a couch, in a field, or at the beach. For this example, a distillation model according to the disclosure can be trained based on the outputs of the one or more expert models.

As indicated above, in addition or alternatively to identifying particular models as experts on a per-label basis, in some implementations, one or more trust models can be trained (e.g., using the validation dataset) for each pre-trained model. The trust model(s) for each pre-trained model can learn to predict, based on the input, when the pre-trained model is providing a correct output (e.g., which can be structured, for each pre-trained model, as a binary classification problem). Alternatively or additionally, a single trust model can be trained to select, based on the input and from all available pre-trained machine-learned models, one or more of the pre-trained machine-learned models to serve as an expert specifically for that input (e.g., which can be structured as a multi-class and/or multi-label classification problem). The trust model(s) can be trained using a validation dataset in which the outputs of each pre-trained model can be evaluated against ground truth data (e.g., thereby providing the ability to learn when to "trust" each pre-trained model).

Aspects of training one or more additional machine-learning models as trust models can include learning underlying trends in each pre-trained model's outputs for the initial dataset. For example, confidence for performing a task (e.g., assigning a label) given a training example may be inferred from the outputs of each pre-trained model. Example output can include labels such as words, phrases and numbers, embeddings such as hidden layers included in a neural network, or numbers. Each trust model can be configured to use some or all of this information in combination with the validation dataset to determine which model or models generate high-quality output for performing a task. In some implementations, training the distillation model may be performed in parallel with training the one or more trust models. In these cases, feedback from the performance of the distillation model for performing a task may also be used to train the trust models.

Thus, analysis using trust models can be focused on providing the trust models with training data to improve their ability to evaluate the confidence, accuracy, or other measure of "correctness" in each pre-trained model's outputs for a given task. As the trust models learn, they improve the ability to differentiate high quality labels from noise.

The computing system can determine whether to include certain pre-trained model outputs in the distillation training dataset based on the evaluation techniques described above. As examples, determining whether to include one or more outputs of the plurality set of outputs in the distillation training dataset can include determining, for each pre-trained machine-learned model and for each label, whether to include in the distillation training dataset all outputs or a subset of the outputs with the label. As an example, determining whether to include one or more outputs of the plurality set of outputs in the distillation training dataset can include, for each classification label: selecting a highest-performing pre-trained machine-learned model for such label; and including in the distillation training dataset all outputs of the set of outputs generated by such pre-trained machine-learned model that have such label.

In certain implementations, determining whether to include one or more outputs of the plurality of sets of outputs in the distillation training dataset can also be based in part on the selection of one or more expert models. For example, a weighting can be applied to some or all outputs from the set of outputs inferred by a pre-trained machine-learned model based in part on the selection of an expert model. This weighting can be used to filter outputs for which the expert model performs better (e.g., best) than the group of pre-trained machine-learned models.

Additionally or alternatively, determining whether to include one or more outputs of the plurality of sets of outputs in the distillation training dataset can also be based in part on the learning rate, accuracy, or other metric used to characterize the distilled machine-learned model.

Having generated a distillation training dataset through strategic selection from the plurality of sets of outputs respectively generated by the plurality of pre-trained models for the initial training dataset, the computing system can train a distilled machine-learned model on the distillation training dataset. An aspect of training the distilled machine-learned model using at least a portion of the distillation training dataset can include selecting a model architecture. For example, the distilled machine-learned model can be configured as a neural network including one or more hidden layers. In certain implementations, the neural network can be configured as a multi-label classifier. The number of labels identified by the distilled machine-learned model can include all or only a portion of the labels or tasks for which one or more respective expert model were identified.

For training the distilled machine-learned model, the portion of the distillation training dataset can include training examples associated with inferred outputs (e.g., outputs inferred by one of the pre-trained models), training examples associated with ground truths, or both. In some implementations, the portion of the distillation training dataset can include a percentage of training examples associated with inferred outputs relative to the total number of trained examples included in the distillation training dataset. For example, the percentage of training examples associated with inferred outputs included in the distillation training dataset can be greater than about 50% (e.g., greater than 60%, 65%, 70%, 75%, 80%, 85%, 90%, or 95%) such that most of the distillation dataset includes inferred labels determined based on the expertise of the pre-trained machine learned models. In some example implementations, the portion of the distillation training dataset may only include training examples associated with inferred outputs (i.e., the percentage is 100%).

In some implementations, it may be advantageous to include different data representations as part of the distillation training dataset. For example, training the distillation model can include passing an embedding to the models as a light-weight representation of more complex data. Additionally, the embedding would implicitly include information about the expert model which can allow the distillation model to take advantage of the expert model's strengths. For example, an expert model can include a trained neural network having one or more hidden layers. Rather than training the distillation model using the output of the full neural network, an output from one or more hidden layers of the pre-trained model (e.g., which may be referred to as an embedding) may be used as the target for the distilled model to match. Using this methodology, the task performed by the expert model does not need to be known beforehand, but it can still be learned by the distillation model using the embedding. That is, the distilled model can be trained to generate as its output an "embedding" produced at an intermediate layer of an expert model.

Since not all machine-learned models will receive input data in the same context, an aspect of certain methods for performing knowledge distillation can include an initial segmentation of the pre-trained machine-learned models based in part on the data-type(s) received by each model. Additionally or alternatively, an aspect of certain methods can include an output filtering or clustering (e.g., grouping) based on the data-type(s) output by each model. One or both of these operations can be performed in parallel or in combination with methods for performing knowledge distillation as disclosed herein.

Aspects of the disclosure can provide improvements to computing technologies and to distillation learning methods by reducing the need to compartmentalize and store training data. Instead, knowledge distillation techniques may rely on the expertise of the pre-trained machine-learning models to infer high-quality outputs by the inclusion of one or more evaluation techniques. Using this methodology may result in decreased costs for data storage. Additionally, certain implementations may be used with initial datasets continuing mostly weak data, which reduces the need for expensive labeling.

The systems and methods of the present disclosure provide a number of technical effects and benefits. As an example technical effect and benefit, the methods and systems for performing knowledge distillation described herein can be implemented using weakly labeled or unlabeled initial datasets that do not necessarily need 100% overlapping label-sets or overlapping domains. This generality can improve the ability of certain implementations to combine disparate models without knowledge of the underlying model architecture or training data. The distilled model may outperform any of the underlying pre-trained models, thereby advancing the state-of-the-art on the specific problem to be addressed.

As another example technical effect and benefit, the systems and methods of the present disclosure can leverage the knowledge of the pre-trained models to learn a highly accurate distilled machine-learned model from an initial training dataset that is primarily weakly labeled or unlabeled. Thus, the need for costly and time-consuming manual labeling can be reduced.

As a further example of technical effect and benefit, the systems and methods of the present disclosure may be implemented without storage or maintenance of the underlying pre-trained models. While storing the actual models is possible, it is not necessary for all implementations. In addition or alternatively to storing the pre-trained models, the predictions of the pre-trained models for a shared input dataset can be stored as a lower representation of the underlying model. Advantages in compute and maintainability may be achieved by keeping the predictions over a shared dataset rather than keeping the models (though at the expense of storage). For example, if a trust-model needs to be updated (or ratings need to be sent) by keeping the predictions this can be done by simply processing existing data.

With reference now to the Figures, example embodiments of the present disclosure will be discussed in further detail.

Example Devices and Systems

Figure 1A:
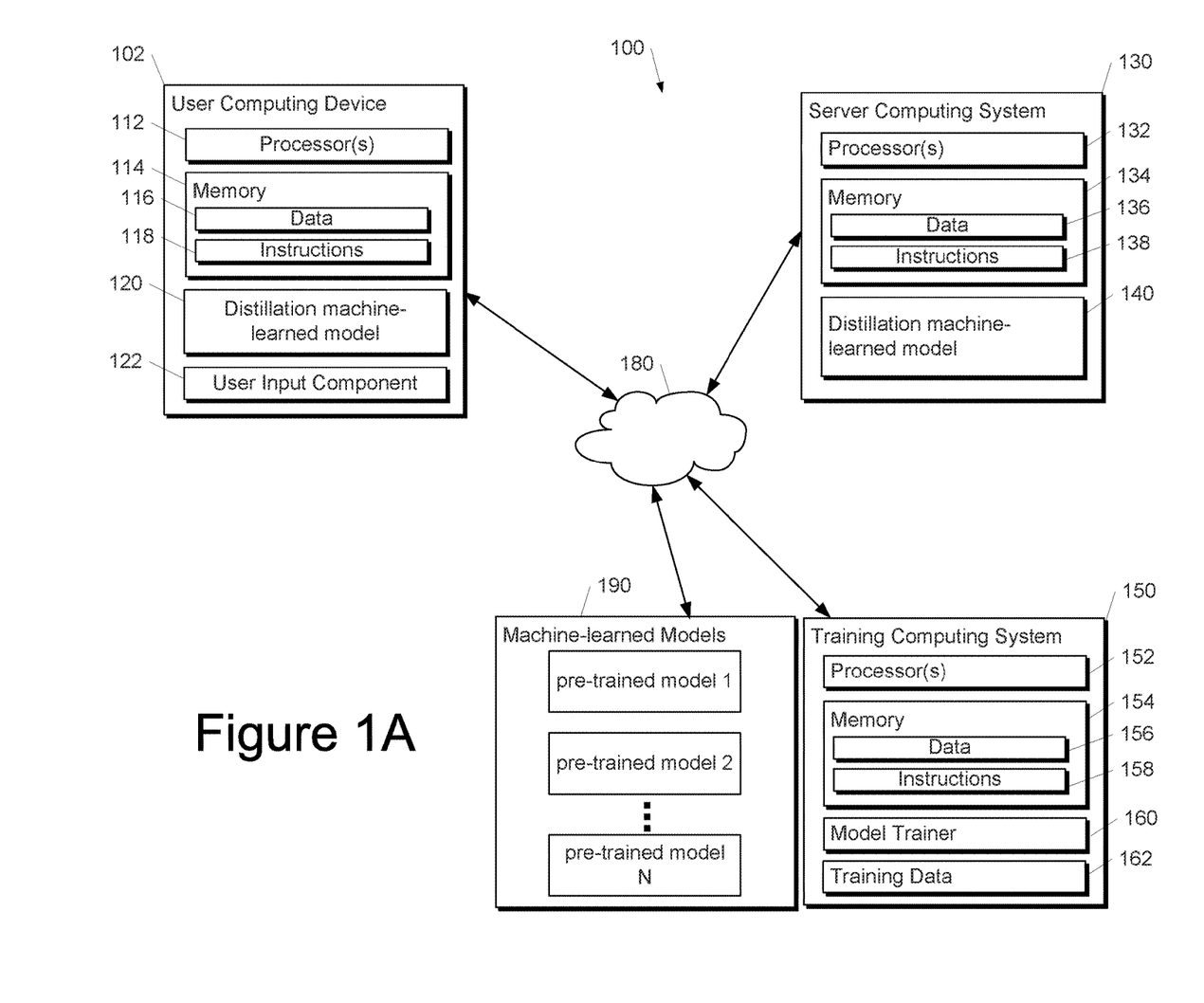
FIG. 1A depicts a block diagram of an example computing system that performs knowledge distillation according to example embodiments of the present disclosure.

FIG. 1A depicts a block diagram of an example computing system 100 for performing knowledge distillation according to example embodiments of the present disclosure. The system 100 includes a user computing device 102, a server computing system 130, a training computing system 150, and a set of machine-learned models 190 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.). and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more distillation machine-learned models 120. For example, the distillation machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example distillation machine-learned models 120 are discussed with reference to FIGS. 2-5.

In some implementations, the one or more distillation machine-learned models 120 can be received from the server computing system 130 over network 180, stored in the user computing device memory 114, and then used or otherwise implemented by the one or more processors 112. In some implementations, the user computing device 102 can implement multiple parallel instances of a single distillation machine-learned model 120 (e.g., to perform parallel training across multiple instances of the distillation training dataset).

More particularly, knowledge distillation utilizes the ability of multiple machine-learned models 190 to infer high-quality outputs for a given task. Using this information, the inferred outputs can be used to curate a distillation training dataset for training the distillation model in one or multiple instances. Aspects of the disclosure include multiple examples for evaluating the set of outputs determined from the machine-learned models 190 that may be used to determine if the outputs should be included in the distillation training dataset. The distillation training dataset can then be used to train one or more distillation machine-learned models 120 140 on a user computing device 102 or a server computing system 130.

Additionally or alternatively, one or more distillation machine-learned models 140 can be included in or otherwise stored and implemented by the server computing system 130 that communicates with the user computing device 102 according to a client-server relationship. For example, the distillation machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.). and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more distillation machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.). and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.). to improve the generalization capability of the models being trained.

In particular, the model trainer 160 can train the distillation machine-learned models 120 and/or 140 based on a set of training data 162. The training data 162 can include, for example, images, text, audio, and other various mediums of data. Additionally, the training data 162 may include examples from various fields such as social networks, chemistry, biology, computer science, and business. In some implementations, the training data 162 may include labeled, and unlabeled data. In certain implementations, the training data 162 may include solely unlabeled data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of these implementations, the user computing device 102 can implement the model trainer 160 to personalize the models 120 based on user-specific data.

Figure 1B:
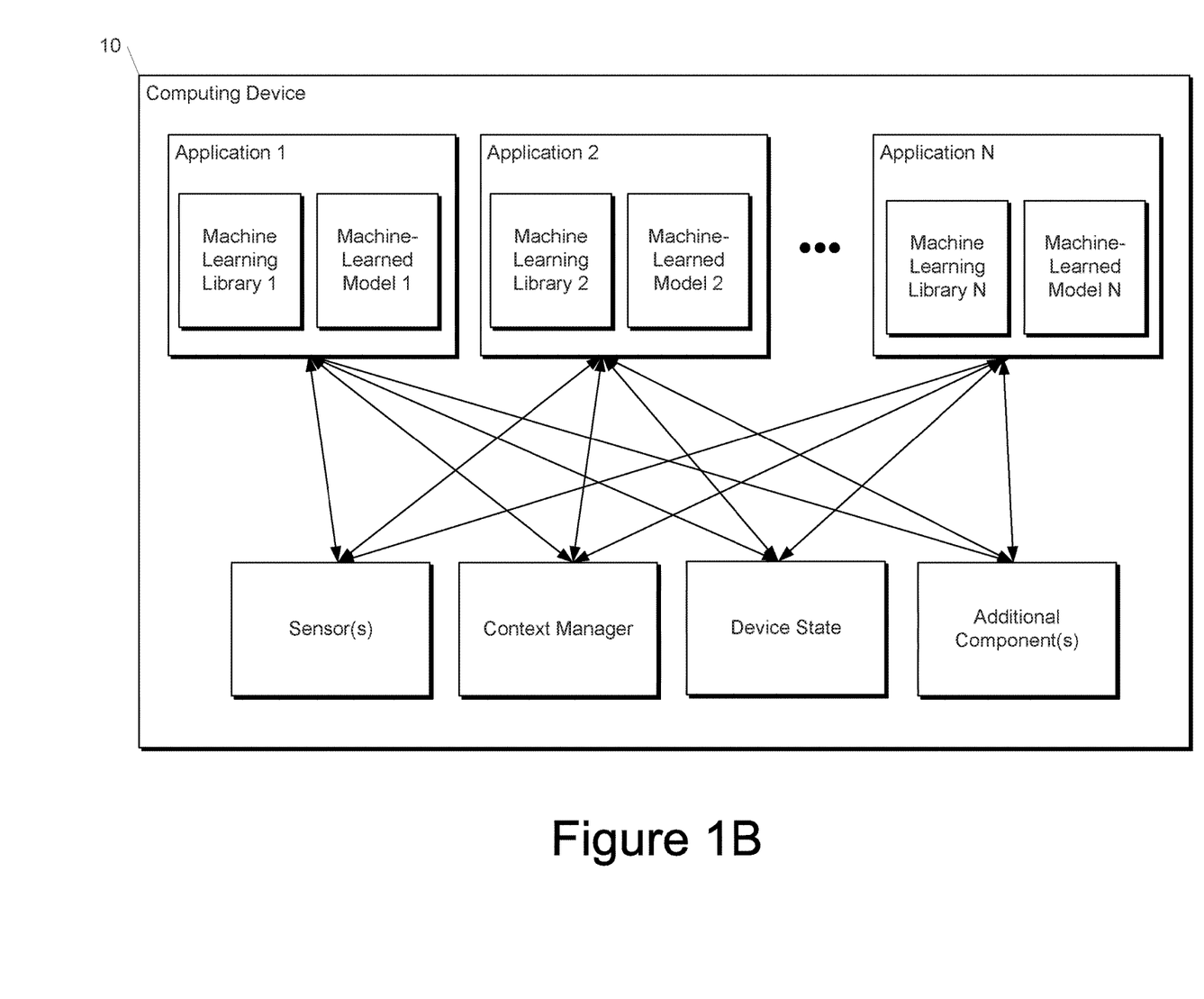
FIG. 1B depicts a block diagram of an example computing device that performs knowledge distillation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
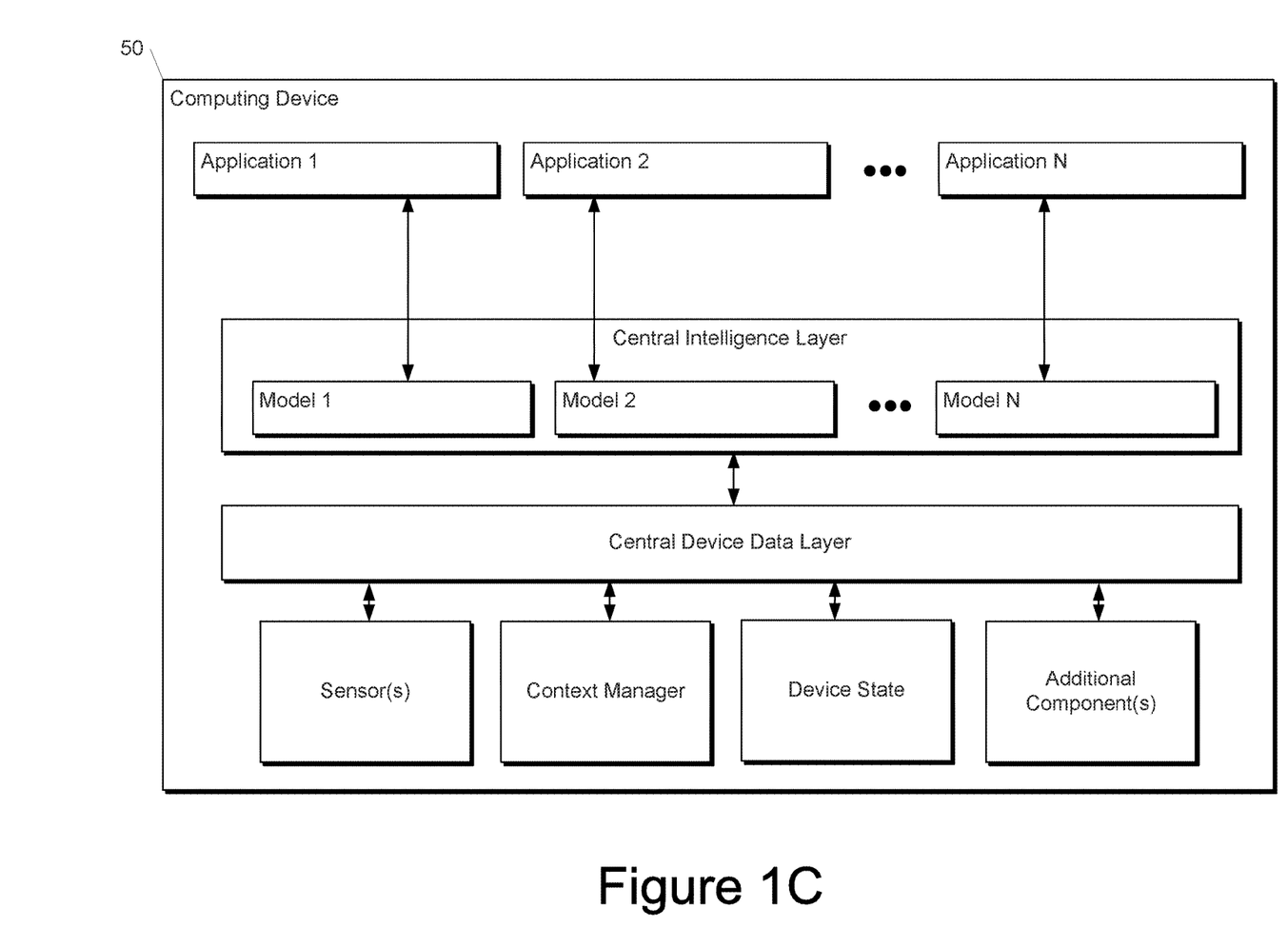
FIG. 1C depicts a block diagram of an example computing device that performs knowledge distillation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
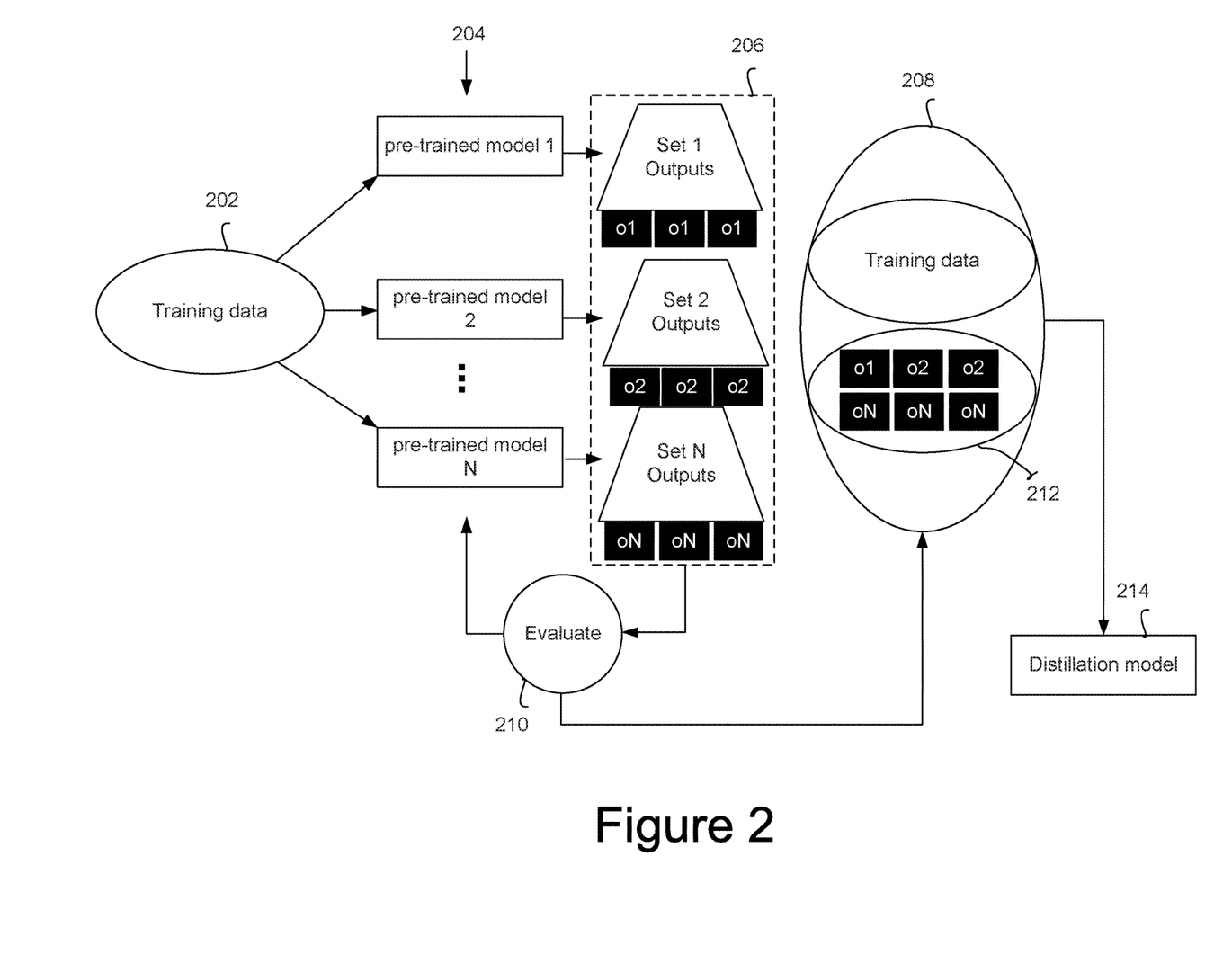
FIG. 2 depicts a block diagram of an example method for performing knowledge distillation according to example embodiments of the present disclosure.

FIG. 2 depicts a block diagram of an example process to generate a distillation machine-learned model 214. Aspects of the disclosure include processes for determining a distillation training dataset 208 for training the distillation model 214. As an example, FIG. 2 illustrates an initial training dataset 202 being provided to a group of pre-trained ML models 204 (e.g., pre-trained candidate 1 through pre-trained candidate N). The training data 202 can be processed by each pre-trained ML model to produce a respective set of outputs 206 for each of the pre-trained ML models 204. In some implementations, a different (but potentially overlapping) subset of the initial training data 202 is processed by each respective model 204. Thus, each model 204 may produce respective outputs 206 on the same or different subsets of training data 202.

An evaluation 210 can be performed based in part on the outputs 206 to characterize the group of pre-trained ML models 204 and this evaluation 210 may be used to help select certain outputs 212 from the plurality of sets of outputs 206 for inclusion in the distillation training dataset 208 for training a distillation model 214.

Figure 3:
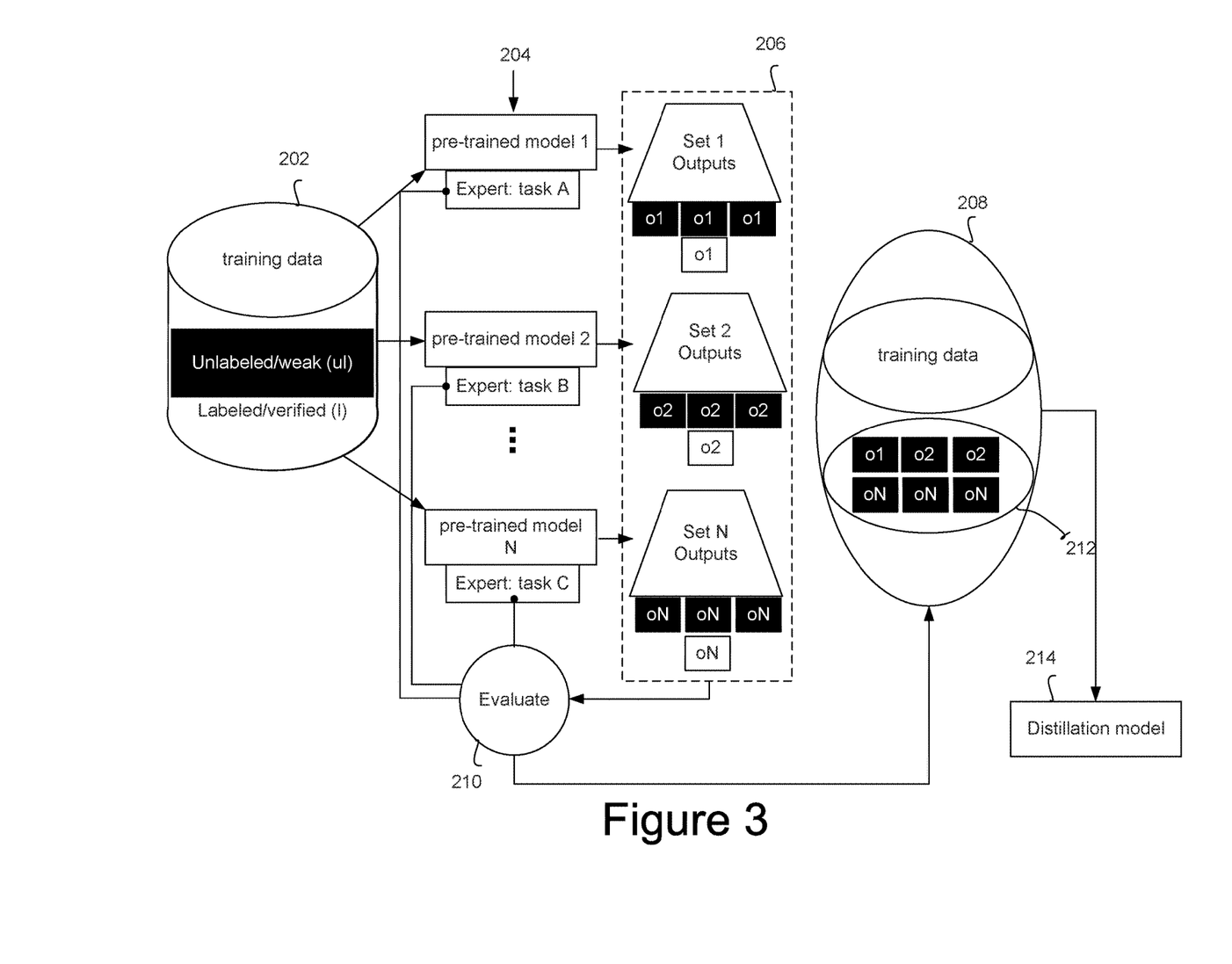
FIG. 3 depicts a block diagram of an example method for performing knowledge distillation from training data including unlabeled or weakly labeled data according to example embodiments of the present disclosure.
Figure 4:
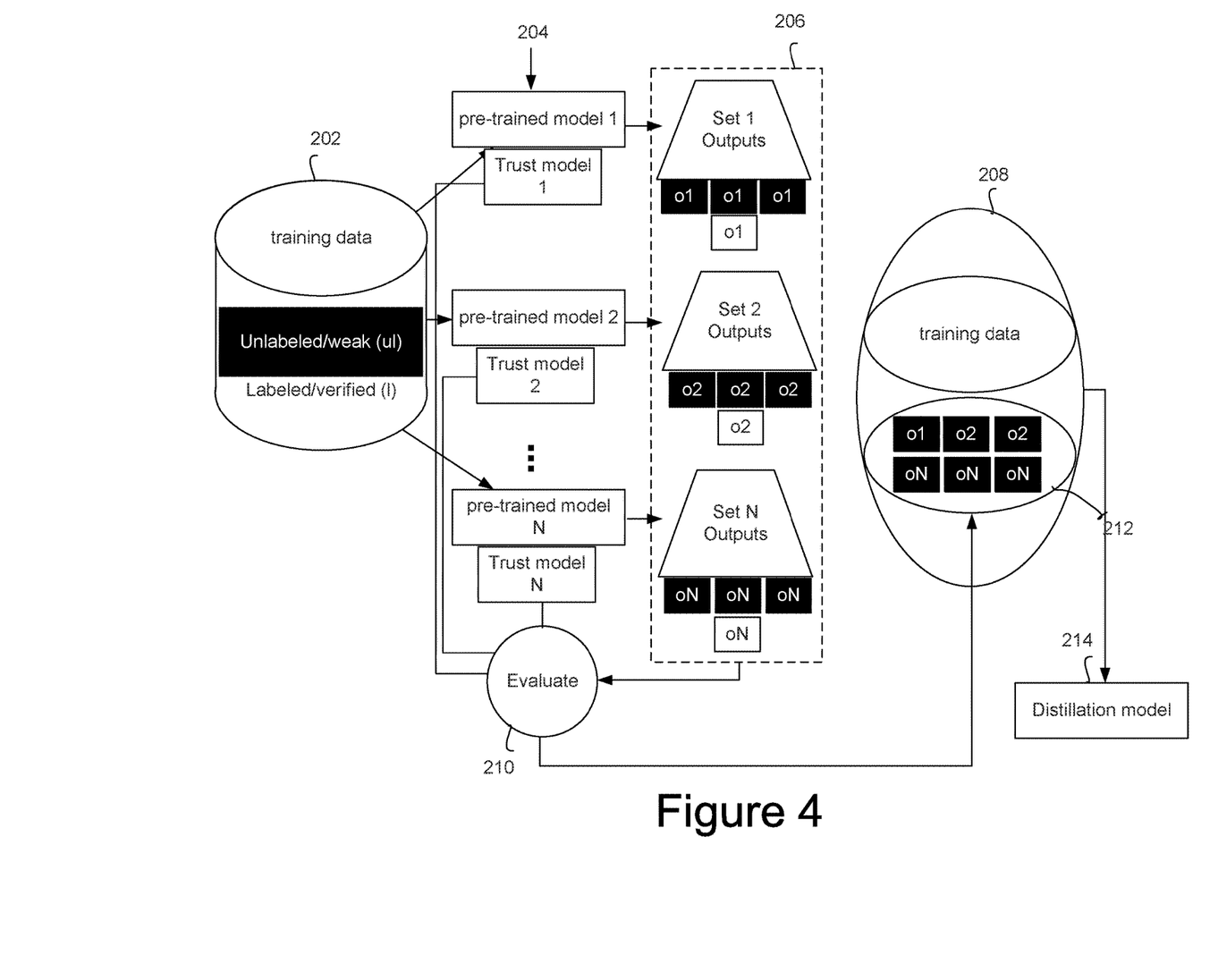
FIG. 4 depicts a block diagram of an example method for performing knowledge distillation from a training data including unlabeled or weakly labeled data according to example embodiments of the present disclosure.

The evaluation 210 of the performance of each pre-trained model 204 can be accomplished in several ways. As an example, as illustrated in FIG. 3, the evaluation 210 can include analyzing each model 204 on a per-label basis (e.g., find best performer for each label). As another example, as illustrated in FIG. 4, the evaluation 210 can include training an additional model which can be referred to as a trust model. In some implementations, the evaluation 210 of each pre-trained model's performance can be accomplished using a validation dataset that includes labeled examples (e.g., examples including or associated with a ground truth). Alternatively, the evaluation of each pre-trained model's performance can be based on the outputs generated by each pre-trained model using a dataset that includes only unlabeled or weakly labeled training examples.

More particularly, referring now to FIG. 3, to generate the distillation dataset 208, an initial dataset 202 containing a number of training examples may first be obtained or generated. Generally, for methods described herein, the training examples included in the initial dataset 202 do not need to be the same as the examples that were used to train each individual pre-trained machine-learned model 204. Instead, by taking advantage of the knowledge contained in each machine-learned model 204, methods and systems disclosed herein may utilize initial datasets 202 that include training examples for performing a task that is related or unrelated to the particular task(s) that each pre-trained model 204 was trained to perform.

In general, methods for performing knowledge distillation in accordance with this disclosure can be used with initial training datasets 202 that include labeled data (e.g., data including some ground truth or label), weakly labeled data, unlabeled data, or a combination of thereof. As an example, in certain implementations the initial dataset 202 can include between about 20% to about 80% of unlabeled or weakly labeled training examples, such as between about 30% to about 75%, about 40% to about 70%, or about 50% to about 60%.

Aspects of the present disclosure include evaluating the outputs 206 from the group of pre-trained models 204 to determine which pre-trained models 204 perform better at certain task(s). For example, a validation dataset can be used in some implementations to determine which model 204 provides outputs that demonstrate higher quality, accuracy, and/or precision for a given task or label. Using this information, high-quality labels can be inferred for the unlabeled training examples without the need for manual labeling or additional data mining to expand the distillation training dataset 208. After generation of a distillation dataset 208 containing high-quality labels, the distillation dataset 208 can be used to train a distillation model 214.

In some implementations, referring still to FIG. 3, evaluating 210 each model 204 on a per-label basis can include comparing the outputs 206 from each pre-trained model 204 to determine the best performer or a group of relatively higher performing pre-trained models 204 for a given label. For example, the initial dataset 202 including a validation dataset can be provided to two pre-trained models 204. Each pre-trained model 204 can generate a set of outputs 206 for both the unlabeled data (ul-output) and the validation data (l-output). The respective outputs 206 generated for the validation data (l-output) can then be compared, for each of the two models, to the ground truth labels of the validation data to determine the best performer or expert model. For instance, each pre-trained model 204 can be configured as a binary classifier trained to determine if an image included a certain dog breed or not. If one pre-trained model 204 were to infer a breed for an image that depicted such breed of dog, while the other did not, this model can be considered the expert for that label. This performance comparison can be extended to outputs generated by each pre-trained model until some threshold is met (e.g., comparison to all models, to a majority of the models, or until enough training examples are associated with high-quality outputs for a label).

As another example, each pre-trained model 204 can generate a set of outputs for both the unlabeled data and the validation data. A population or consensus label can then be determined using the output 206 of each pre-trained model 204 for a training example. The population or consensus label can be an average, distribution, or other statistic determined using the collective outputs 206. For instance, using the same dog breed example, the average output for a training example including an image of a collie should ideally be low (i.e., most of the pre-trained models were not trained to identify that specific breed). Selecting the expert pre-trained model can include comparing each model output for a training example to the consensus and selecting one or more models that differ from the consensus by a threshold (e.g., standard deviation, percentile, etc.). as the expert model(s) for a given label. In the case that more than one expert model is determined for assigning a label, high quality labels may be inferred as the consensus of all expert models. Alternatively, high quality labels may include any output by each expert model related to the label assigned or associated with that model.

Thus, analysis on a per-label basis can be focused on evaluating 210 the ability of each pre-trained model 204 for performing a task (e.g., assigning a label) to determine an expert model for the task. The expert model for a task will be considered as producing high-quality inference, but only for the identified task. However, this does not omit the possibility that one pre-trained model may be configured to perform multiple tasks and so the same methodology may be used to assign one pre-trained model as the expert for one or more tasks. Similarly, this analysis may reveal that none of the pre-trained models are experts for a given task or that multiple pre-trained models are experts for a general task, but that other attributes of the input training examples can be used to assign multiple experts having complementary specializations. As an example, again using the dog breed scenario, one or more expert models can be assigned for detecting the same breed but differentiated based on the background in an image such as if the breed is on a couch, in a field, or at the beach. For this example, a distillation model 2214 according to the disclosure can be trained based on the outputs of the one or more expert models.

The computing system can determine whether to include certain pre-trained model outputs 206 in the distillation training dataset 208 based on the evaluation techniques described above. As examples, selecting one or more outputs 206 of the plurality of sets of outputs for inclusion in the distillation training dataset 208 can include determining, for each pre-trained machine-learned model 204 and for each label, whether to include in the distillation training dataset 208 all outputs or a subset of the outputs with the label. As an example, determining whether to include one or more outputs 206 of the plurality set of outputs in the distillation training dataset 208 can include, for each classification label: selecting a highest-performing pre-trained machine-learned model 204 for such label; and including in the distillation training dataset all outputs of the set of outputs 206 generated by such pre-trained machine-learned model 204 that have such label.

In certain implementations, selecting one or more outputs 206 of the plurality of sets of outputs for inclusion in the distillation training dataset 208 can also be based in part on the selection of one or more expert models. For example, a weighting can be applied to some or all outputs 206 from the set of outputs inferred by a pre-trained machine-learned model based in part on the selection of an expert model. This weighting can be used to filter outputs for which the expert model performs better (e.g., best) than the group of pre-trained machine-learned models.

Referring now to FIG. 4, as indicated above, in addition or alternatively to identifying particular models as experts on a per-label basis, in some implementations, one or more trust models can be trained (e.g., using the validation dataset) for each pre-trained model 204. The trust model(s) for each pre-trained model 204 can learn to predict, based on the input, when the pre-trained model 204 is providing a correct output 206 (e.g., which can be structured, for each pre-trained model, as a binary classification problem). Alternatively or additionally, a single trust model can be trained to select, based on the input and from all available pre-trained machine-learned models, one or more of the pre-trained machine-learned models 204 to serve as an expert specifically for that input (e.g., which can be structured as a multi-class and/or multi-label classification problem). The trust model(s) can be trained using a validation dataset in which the outputs 206 of each pre-trained model 204 can be evaluated against ground truth data (e.g., thereby providing the ability to learn when to "trust" each pre-trained model 204).

Aspects of training one or more additional machine-learning models as trust models can include learning underlying trends in each pre-trained model's outputs 206 for the initial dataset 202. For example, confidence for performing a task (e.g., assigning a label) given a training example may be inferred from the outputs 206 of each pre-trained model 204. Example output 206 can include labels such as words, phrases and numbers, embeddings such as hidden layers included in a neural network, or numbers. Each trust model can be configured to use some or all of this information in combination with the validation dataset to determine which model or models 204 generate high-quality output for performing a task. In some implementations, training the distillation model 214 may be performed in parallel with training the one or more trust models. In these cases, feedback from the performance of the distillation model 214 for performing a task may also be used to train the trust models.

Thus, analysis using trust models can be focused on providing the trust models with training data to improve their ability to evaluate the confidence, accuracy, or other measure of "correctness" in each pre-trained model's outputs 206 for a given task. As the trust models learn, they improve the ability to differentiate high quality labels from noise.

The computing system can determine whether to include certain pre-trained model outputs 206 in the distillation training dataset 208 based on the evaluation techniques described above. As an example, the predictions of the trust models can be used to select which outputs 206 are included in the distillation training dataset 208 (e.g., if the trust model predicts that a certain output 206 from a certain model 204 is correct based on the input, such output 206 can be included in the distillation training dataset 208).

Referring again to FIG. 2, for training the distillation model, the training examples included in the training data 202 can be provided to the distillation model along with a certain outputs 212 (e.g., high-confidence outputs) that have been determined based in part on the respective performance of each of the pre-trained ML models 204. In this manner, unlabeled or weakly labeled examples included in the training data 202 can be included in a distillation training dataset 208 used to train the distillation model 214 by associating these examples with a predicted output 206 from one of the pre-trained models 204. Thus, the process shown in FIG. 2 demonstrates providing an initial dataset 202 to a group of pre-trained ML models 204 to generate sets of outputs 206 (e.g., set 1 outputs, set 2 outputs, etc.). for the group of pre-trained model 204. Each set of outputs included in the sets of outputs 206 can then be evaluated to to determine whether none, some or all of the outputs 206 from each set of outputs should be included in a distillation training dataset 208 (e.g., based on the confidence of the pre-trained model for performing the task associated with the output). For instance, FIG. 2 depicts that only one output (o1) from the set of outputs generated by pre-trained model 1 was selected for inclusion in the distillation training dataset 208. Since the outputs selected for inclusion in the distillation training dataset 208 were determined from training examples included in the training data, some or all of the training data 202 may be included in the distillation training dataset 208.

According to example embodiments of the present disclosure, in some implementations, as illustrated in FIG. 3, the evaluation 210 can be performed to determine or designate an expert ML model for accomplishing a task (e.g., task A, task B, or task C). Example tasks can include image classification such as identification of a dog breed, natural language processing such as audio to text, etc. The identification of an expert ML model can help improve the quality of the distillation training dataset which may further improve the distillation model to distinguish between similar tasks.

In some implementations, as illustrated in FIG. 4, the evaluation 210 can be performed based in part on the output from one or more trust models (e.g., trust model 1, 2, . . . N). The trust model(s) can each be trained to determine expertise for a ML model to perform certain tasks, or one trust model may be trained to determine expertise for all the ML models at performing a specific task. Thus for implementations disclosed herein, the trust model(s) may be trained on a per-task basis, on a per-ML model basis, or a combination of both. Additionally, feedback based on the performance of the distillation model for performing a certain task may be used in certain implementations to train the one or more trust models.

Example Methods

Figure 5:
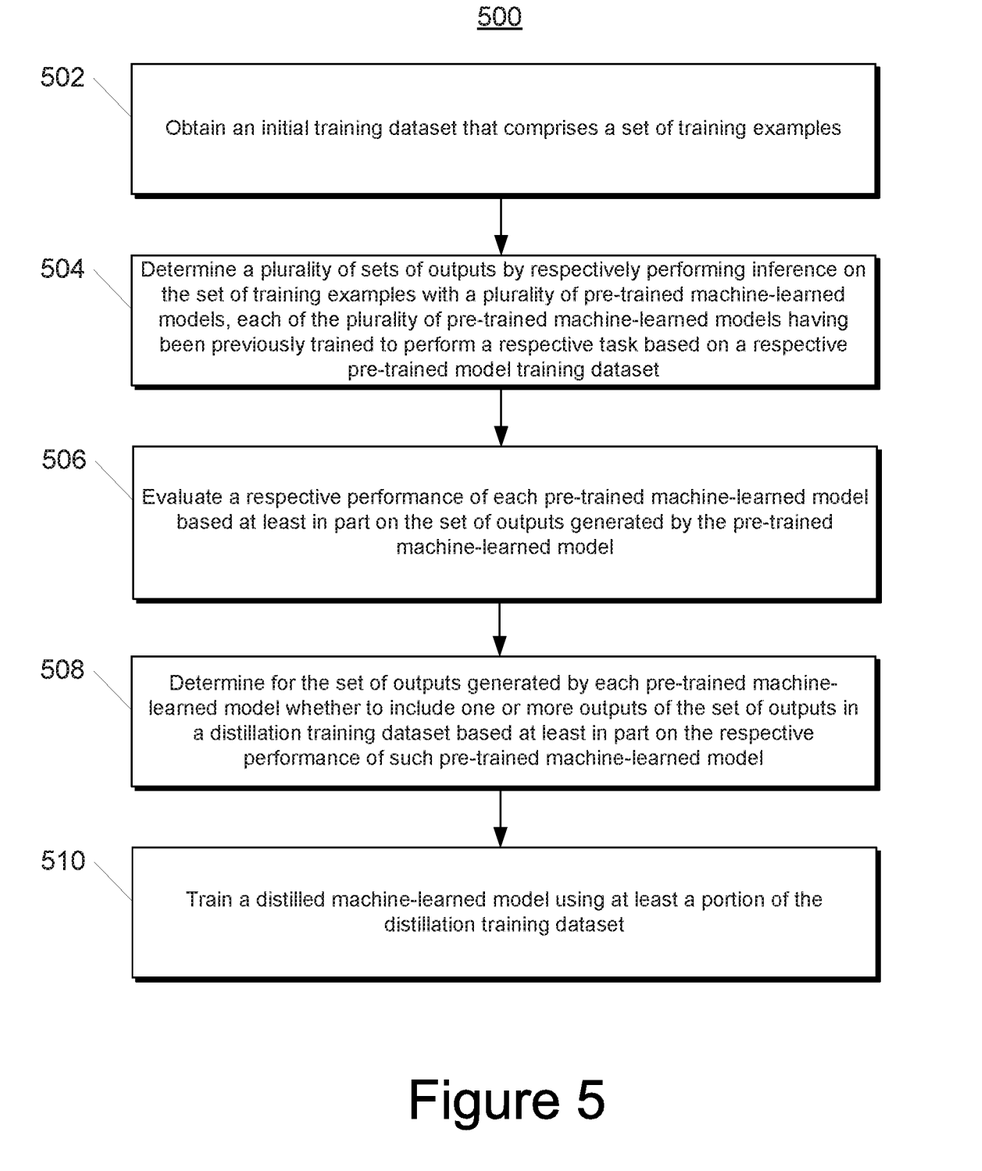
FIG. 5 depicts a flow chart diagram of an example method to perform knowledge distillation according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system may obtain an initial training dataset that comprises a set of training examples. In certain implementations, the initial training dataset can include a first portion that is labeled and a second portion that is not labeled, and wherein the first portion of the initial training dataset is used as the validation dataset. Obtaining the initial training dataset can include accessing data libraries, generating training data, and/or updating or otherwise modifying data. For example, data showing an image of a dog may be accessed through the Internet, obtained by taking a photograph, or an image of multiple dogs may be modified to only focus or include a single dog.

At 504, the computing system may determine a plurality of sets of outputs by respectively performing inference on the set of training examples with a plurality of pre-trained machine-learned models, each of the plurality of pre-trained machine-learned models having been previously trained to perform a respective task based on a respective pre-trained model training dataset. In general performing inference can include providing one or all of the training examples in the initial dataset to each of the pre-trained machine-learned models. Additionally the sets of outputs can be the true output of the machine-learned model or an intermediate representation such as an embedding (e.g., a hidden layer when using a neural network.)

At 506, the computing system may evaluate a respective performance of each pre-trained machine-learned model based at least in part on the set of outputs generated by the pre-trained machine-learned model. For example, evaluating the performance can be performed on a per-label basis or can be performed through the use of one or more trust models.

At 508, the computing system may determine for the set of outputs generated by each pre-trained machine-learned model whether to include one or more outputs of the set of outputs in a distillation training dataset based at least in part on the respective performance of such pre-trained machine-learned model. For example, outputs can be selected on a per-label basis, according to the trust model(s), and/or according to other techniques.

At 510, the computing system train a distilled machine-learned model using at least a portion of the distillation training dataset.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing knowledge distillation, the method comprising:
    obtaining, by one or more computing devices, an initial training dataset that comprises a set of training examples;
    obtaining, by the one or more computing devices, a plurality of sets of outputs respectively produced for the set of training examples by processing the set of examples with a plurality of pre-trained machine-learned models, each of the plurality of pre-trained machine-learned models having been previously trained to perform a respective task based on a respective pre-trained model training dataset, wherein the initial training dataset differs from one or more of the plurality of respective pre-trained model training datasets, wherein the plurality of sets of outputs are obtained without accessing the plurality of respective pre-trained model training datasets for the plurality of pre-trained machine-learned models;
    evaluating, using one or more machine-learned trust models and by the one or more computing devices, a respective performance of each pre-trained machine-learned model based at least in part on the set of outputs generated by the respective pre-trained machine-learned model, wherein the one or more machine-learned trust models were trained to evaluate pre-trained machine-learned model performance based on the set of outputs for the respective pre-trained machine-learned model, wherein the one or more machine-learned trust models were trained with a validation dataset, wherein the validation dataset differs from the plurality of respective pre-trained model training datasets;

determining, by the one or more computing devices, for the set of outputs generated by each pre-trained machine-learned model, whether to include one or more outputs of the set of outputs in a distillation training dataset based at least in part on the respective performance of such pre-trained machine-learned model as determined by the one or more machine-learned trust models, wherein the distillation training dataset comprises a first output generated by a first pre-trained machine-learned model associated with a first training example and a second output generated by a second pre-trained machine-learned model associated with a second training example; and training, by the one or more computing devices, a distilled machine-learned model using at least a portion of the distillation training dataset.

2. The computer-implemented method of claim 1, wherein the plurality of pre-trained machine-learned models comprise pre-trained classifier models configured to infer one or more classification labels for each training example as an output.

3. The computer-implemented method of claim 2, wherein evaluating, by the one or more computing devices, the respective performance of each pre-trained machine-learned model based at least in part on the set of outputs generated by the pre-trained machine-learned model comprises evaluating, by the one or more computing devices, the respective performance of each pre-trained machine-learned model on a per-classification label basis.

4. The computer-implemented method of claim 3, wherein determining, by the one or more computing devices for the set of outputs generated by each pre-trained machine-learned model, whether to include one or more outputs of the plurality set of outputs in the distillation training dataset comprises determining, by the one or more computing devices for each pre-trained machine-learned model and for each classification label, whether to include in the distillation training dataset all outputs of the set of outputs with the classification label.

5. The computer-implemented method of claim 3, wherein determining, by the one or more computing devices for the set of outputs generated by each pre-trained machine-learned model, whether to include one or more outputs of the plurality set of outputs in the distillation training dataset comprises, for each classification label:

selecting, by the one or more computing devices, a highest-performing pre-trained machine-learned model for such classification label; and including, by the one or more computing devices, in the distillation training dataset all outputs of the set of outputs generated by the highest-performing pre-trained machine-learned model that have such classification label.

6. The computer-implemented method of claim 1, wherein evaluating, by the one or more computing devices, the respective performance of each pre-trained machine-learned model based at least in part on the set of outputs generated by the pre-trained machine-learned model comprises training, by the one or more computing devices using the validation dataset, the one or more machine-learned trust models to evaluate the respective performance of each pre-trained machine-learned model.

7. The computer-implemented method of claim 6, wherein determining, by the one or more computing devices for the set of outputs generated by each pre-trained machine-learned model, whether to include one or more outputs of the set of outputs in the distillation training dataset based at least in part on the respective performance of such pre-trained machine-learned model comprises, for each pre-trained machine-learned model:

providing, by the one or more computing devices, each respective training example as an input into at least one of the one or more trust models; and receiving, by the one or more computing devices, an output from the at least one of the one or more trust models that indicates whether the corresponding output generated by the pre-trained machine-learned model for the respective training example should be included in the distillation training dataset.

8. The computer-implemented method of claim 6, wherein the initial training dataset comprises a first portion that is labeled and a second portion that is not labeled, and wherein the first portion of the initial training dataset is used as the validation dataset.

9. The computer-implemented method of claim 6, wherein the one or more machine-learned trust models each comprise a neural network.

10. The computer-implemented method of claim 1, wherein evaluating, by the one or more computing devices, a respective performance of each pre-trained machine-learned model comprises:

selecting, by the one or more computing devices, one or more expert models from the plurality of pre-trained machine-learned models by comparing a population statistic determined in part from the plurality of sets of outputs to the set of outputs determined by at least one of the pre-trained machine-learned models.

11. The computer-implemented method of claim 10 wherein selecting, by the one or more computing devices, one or more expert models comprises comparing the population statistic to each set of outputs determined respectively by each pre-trained machine-learned model.

12. The computer-implemented method of claim 10, wherein determining, by the one or more computing devices, whether to include one or more outputs of the plurality of sets of outputs in the distillation training dataset is further based at least in part on a weighting applied to each of the sets of outputs generated by the one or more expert models.

13. The computer-implemented method of claim 1, wherein at least 50% of the initial comprises unlabeled or weakly labeled training examples.

14. The computer-implemented method of claim 1, wherein obtaining the plurality of sets of outputs comprises respectively performing inference on the set of training examples with the plurality of pre-trained machine-learned models.

15. A computing system configured to perform knowledge distillation, the computing system comprising:

one or more processors; and one or more non-transitory computer-readable media that collectively store instructions that, when executed by the one or more processors cause the computing system to perform operations, the operations comprising:

obtaining an initial training dataset that comprises a set of training examples and a plurality of sets of outputs for the set of training examples, the plurality of sets of outputs respectively produced by processing the set of examples with a plurality of pre-trained machine-learned models, each of the plurality of pre-trained machine-learned models having been previously trained to perform a respective task based on a respective pre-trained model training dataset, wherein the initial training dataset differs from one or more of the plurality of respective pre-trained model training datasets, wherein the plurality of sets of outputs are obtained without accessing the plurality of respective pre-trained model training datasets for the plurality of pre-trained machine-learned models;

evaluating, using one or more machine-learned trust models, a respective performance of each pre-trained machine-learned model based at least in part on the set of outputs generated by the respective pre-trained machine-learned model, wherein the one or more machine-learned trust models were trained to evaluate pre-trained machine-learned model performance based on the set of outputs for the respective pre-trained machine-learned model, wherein the one or more machine-learned trust models were trained with a validation dataset, wherein the validation dataset differs from the plurality of respective pre-trained model training datasets;

determining a distillation training dataset by selecting an output from the plurality of sets of outputs for a respective training example of the set of training examples based at least in part on the respective performance of each pre-trained machine-learned model, wherein a respective output is selected for each of one or more respective training examples of the set of training examples; and training a distilled machine-learned model using at least a portion of the distillation training dataset.

16. The computing system of claim 15, wherein evaluating the respective performance of each pre-trained machine-learned model based at least in part on the set of outputs generated by the pre-trained machine-learned model comprises:

training, using the validation dataset comprising ground truth data, the one or more machine-learned trust models to evaluate the respective performance of each pre-trained machine-learned model; and determining a respective binary classification for each of the set of outputs, wherein the binary classification is descriptive of a comparison between an output and ground truth data.

17. The computing system of claim 15, wherein obtaining the plurality of sets of outputs comprises accessing the plurality of sets of outputs from a database that stores previously generated inferences for the plurality of pre-trained machine-learned models.

18. The computing system of claim 15, wherein whether to include the one or more outputs of the set of outputs is based at least in part on a learning rate of the distilled machine-learned model.

19. The computing system of claim 15, wherein evaluating the respective performance of each pre-trained machine-learned model comprises determining at least one of a respective accuracy or a respective precision of one or more of the set of outputs for each of the plurality of pre-trained machine-learned models.

20. One or more non-transitory computer-readable medium that store instructions for performing knowledge distillation that, when executed by one or more computing devices, cause the one or more computing devices to perform operations, the operations comprising:

obtaining an initial training dataset that comprises a set of training examples and a plurality of sets of outputs for the set of training examples, the plurality of sets of outputs respectively produced by processing the set of examples with a plurality of pre-trained machine-learned models, each of the plurality of pre-trained machine-learned models having been previously trained to perform a respective task based on a respective pre-trained model training dataset, wherein the initial training dataset differs from one or more of the plurality of respective pre-trained model training datasets, wherein the plurality of sets of outputs are obtained without accessing the plurality of respective pre-trained model training datasets for the plurality of pre-trained machine-learned models;

evaluating, using one or more machine-learned trust models, a respective performance of each pre-trained machine-learned model based at least in part on the set of outputs generated by the respective pre-trained machine-learned model, wherein the one or more machine-learned trust models were trained to evaluate pre-trained machine-learned model performance based on the set of outputs for the respective pre-trained machine-learned model, wherein the one or more machine-learned trust models were trained with a validation dataset, wherein the validation dataset differs from the plurality of respective pre-trained model training datasets;

determining for the set of outputs generated by each pre-trained machine-learned model whether to include one or more outputs of the set of outputs in a distillation training dataset based at least in part on the respective performance of such pre-trained machine-learned model, wherein the distillation training dataset comprises a first output generated by a first pre-trained machine-learned model associated with a first training example and a second output generated by a second pre-trained machine-learned model associated with a second training example; and training a distilled machine-learned model using at least a portion of the distillation training dataset.

* * * * *